(12) United States Patent
Malec

(10) Patent No.: US 8,770,613 B1
(45) Date of Patent: Jul. 8, 2014

(54) SHOCK PROTECTION APPARATUS

(71) Applicant: Frank A. Malec, Foster, RI (US)

(72) Inventor: Frank A. Malec, Foster, RI (US)

( * ) Notice: Subject to any disclaimer, the term of this patent is extended or adjusted under 35 U.S.C. 154(b) by 38 days.

(21) Appl. No.: 13/710,621

(22) Filed: Dec. 11, 2012

Related U.S. Application Data

(60) Provisional application No. 61/578,651, filed on Dec. 21, 2011.

(51) Int. Cl.
*B60D 1/00* (2006.01)

(52) U.S. Cl.
USPC ............................ 280/506; 280/504; 280/485

(58) Field of Classification Search
USPC ........................................ 280/504, 506, 485
See application file for complete search history.

(56) References Cited

U.S. PATENT DOCUMENTS

| | | | | |
|---|---|---|---|---|
| 5,685,686 A * | 11/1997 | Burns | ............................ | 414/462 |
| 6,834,879 B1 * | 12/2004 | Lorman | ......................... | 280/506 |
| 7,527,309 B2 * | 5/2009 | Smidler | ......................... | 293/155 |
| 7,594,673 B1 * | 9/2009 | Devlin | ............................ | 280/506 |
| 7,717,455 B2 * | 5/2010 | Morris | ............................ | 280/506 |
| 2005/0173893 A1 * | 8/2005 | Buckley et al. | ................ | 280/504 |

* cited by examiner

*Primary Examiner* — Kevin Hurley
*Assistant Examiner* — Michael Stabley
(74) *Attorney, Agent, or Firm* — Salter & Michaelson

(57) ABSTRACT

A shock protection apparatus that include, in combination, a machine being towed, a towing vehicle coupled to and for towing the machine being towed, and an electrically insulating insert coupled between the vehicle and machine to prevent the transfer of an electrical shock from the vehicle to the machine. The machine includes a towing tongue and the electrically insulating insert is constructed and arranged in the tongue so as to provide a gap between separate metal portions of the tongue.

16 Claims, 6 Drawing Sheets

SHOCK PROTECTION APPARATUS

RELATED CASES

Priority for this application is hereby claimed under 35 U.S.C. §119(e) to commonly owned U.S. Provisional Patent Application No. 61/578,651 which was filed on Dec. 21, 2011 and which is incorporated by reference herein in its entirety.

FIELD OF THE INVENTION

The present invention relates in general to a technique for preventing an electrical shock from transferring from a vehicle to a trailer or other machine being towed. More particularly, the present invention relates to a technique for inhibiting the transfer of electrical shock from a vehicle to a wood chipper.

BACKGROUND OF THE INVENTION

There are many instances where a vehicle is used for pulling a trailer or the like. An example of this is where a truck is used for pulling behind it a wood chipper. One event that can occur is that the chassis of the truck becomes electrified due to a fault condition. This can cause a dangerous situation for workers that are using a follow-on apparatus such as a wood chipper.

Because this fault condition can occur almost spontaneously, and because the visibility about the wood chipper is limited, there is a clear danger to the workers about the machine for the possibility of electrical shock or even electrocution.

Thus, it is an object of the present invention to provide a technique whereby the transfer of any electrical signal is prevented from the truck to the follow-on apparatus whether it be a wood chipper or other apparatus or machine. This objective is attained in accordance with the present invention by providing an insulation insert in the frame that connects the follow-on apparatus or machine with the vehicle.

SUMMARY OF THE INVENTION

To accomplish the foregoing and other objects, features and advantages of the present invention there is provided a shock protection apparatus comprising, in combination, a machine being towed, a towing vehicle coupled to and for towing the machine being towed, and an electrically insulating insert coupled between the vehicle and machine to prevent the transfer of an electrical shock from the vehicle to the machine.

In accordance with other aspects of the present invention the machine includes a towing tongue and the electrically insulating insert is constructed and arranged in said tongue so as to provide a gap between separate metal portions of the tongue; the machine being towed is a wood chipper machine; the vehicle is a car or truck; the vehicle has a tow hitch including a ball, and said tongue has a tow socket; the electrically insulating insert is constructed of a nonconductive material; the nonconductive material may be selected from kevlar or fiberglass; the electrically insulating insert may be comprised of a series of telescopically arranged tubular pieces; the series of telescopically arranged tubular pieces are constructed and arranged as a single integral member that is formed by including a binder of fiberglass and an epoxy resin; the series of telescopically arranged tubular pieces are one of circular and square leaving a center core area filed with a fiberglass mat and an epoxy resin to form said single integral member; alternatively, the vehicle has a rear mounted pintle plate formed as the electrically insulating insert; the separate metal tongue portions are spaced apart and the electrically insulating insert has a length greater than the spacing between the separate metal tongue portions so that respective ends of the electrically insulating insert extend into a center hollow section of respective separate metal tongue portions; including a collar disposed over the electrically insulating insert and separate metal tongue portions; and including fasteners for securing the collar and electrically insulating insert to the metal tongue portions.

In accordance with another version of the present invention there is provided, for a vehicle that tows a trailing machine or the like, an electrically insulating insert that is disposed between a frame of the vehicle and trailing machine to prevent electrical shock signals from passing from the vehicle to the trailing machine.

In accordance with other aspects of the present invention the trailing machine includes a towing tongue and said electrically insulating insert is constructed and arranged in said tongue so as to provide a gap between separate metal portions of said tongue; the electrically insulating insert is comprised of a series of telescopically arranged tubular pieces; the series of telescopically arranged tubular pieces are constructed and arranged as a single integral member that is formed by including a binder of fiberglass and an epoxy resin; the series of telescopically arranged tubular pieces are one of circular and square leaving a center core area filed with a fiberglass mat and an epoxy resin to form said single integral member; and including a collar disposed over the electrically insulating insert and separate metal tongue portions, and fasteners for securing the collar and electrically insulating insert to the metal tongue portions.

DESCRIPTION OF THE DRAWING

It should be understood that the drawing is provided for the purpose of illustration only and is not intended to define the limits of the disclosure. In the drawing depicting the present invention, all dimensions are to scale. The foregoing and other objects and advantages of the embodiments described herein will become apparent with reference to the following detailed description when taken in conjunction with the accompanying drawing in which.

DETAILED DESCRIPTION

Figure 1:
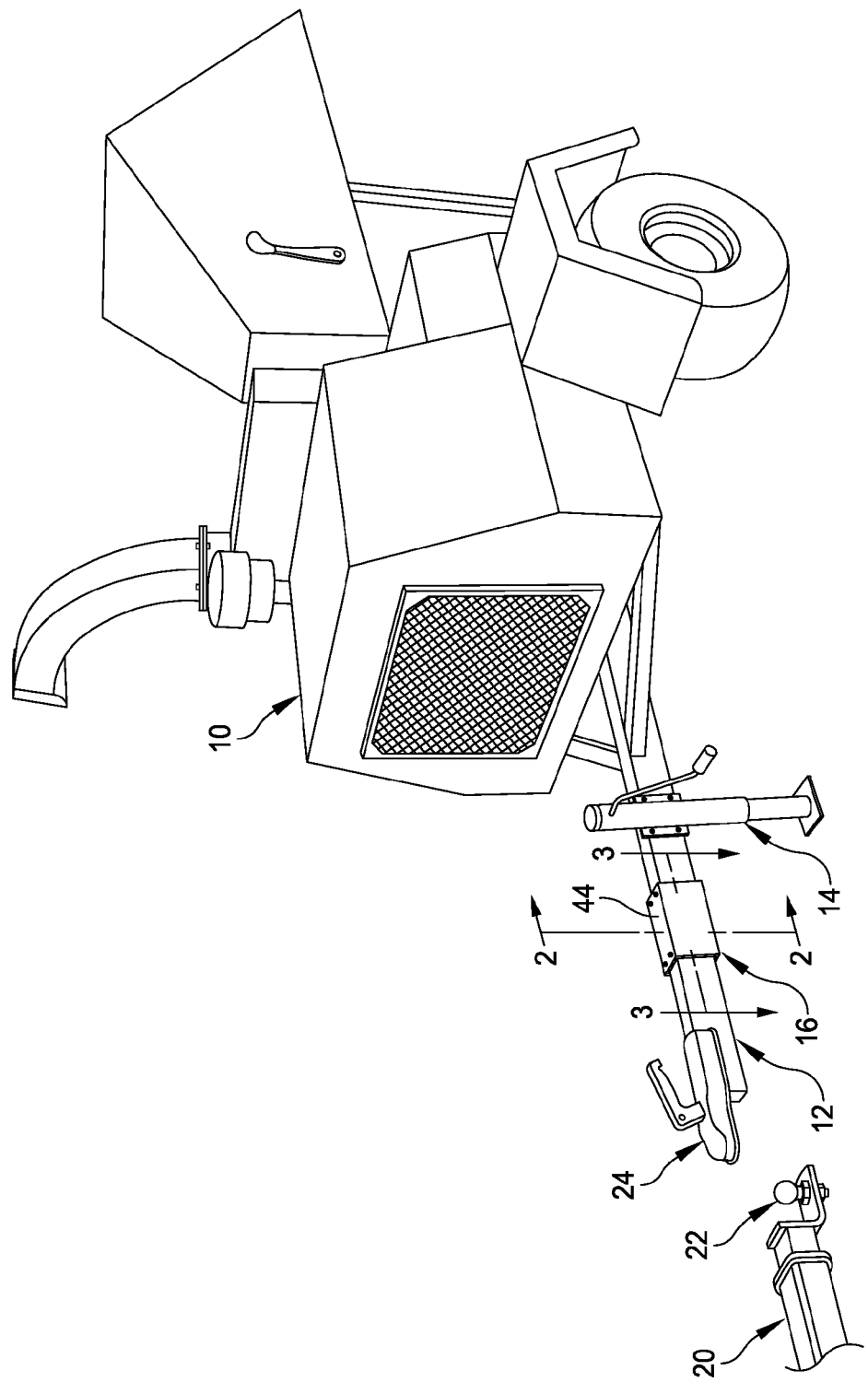
FIG. 1 illustrates one embodiment of the present invention that may be in the form of a wood chipper that is trailed behind a vehicle such as a truck, and incorporating the electrically insulating insert of the present invention.

Reference is now made to a drawing that illustrates a follow-on trailer or machine which in the illustrated embodiment is in the form of a wood chipper 10. The wood chipper 10 is for the most part of conventional design and in the marketplace there are a wide variety of different types of wood chippers that may be used. Also, the principles of the present invention apply to other types of trail behind apparatuses or machines. For example, the principles of the present invention could apply to a trailer-type apparatus for hauling vehicles or in connection with a trailer used for moving telephone poles.

Any of these types of apparatuses include a main connection beam, tongue or frame 12. These types of follow-on trailers are attached to a vehicle, a fragmentary portion of which is shown in the drawing at 20. As with the follow-on apparatus, the vehicle itself can be of any type. It is typical for the vehicle to have a tow hitch including a ball member at 22 and a socket member at 24. The tow hitch is supported at the very end of the tongue or beam 12. The tongue or beam 12 is constructed of a heavy metal material such as steel, and is hollow, usually of square cross-section. Also included usually is a jack device 14 conveniently located somewhere along the length of the tongue 12.

Now, in accordance with the present invention, in order to prevent the transfer of any electrical shock signal generated at the vehicle and through to the tongue 12, there is provided an electrical insulating insert 16. This insert 16 may be constructed of any nonconductive material including by way of example kevlar or fiberglass. The insert 16 is constructed so that is has sufficient strength and a strength similar to the strength of the metal support tongue 12. The cross-sectional shape and area of the insert 16 is also preferably substantially the same as that of the tongue 12. Should there be a pair of beams that couple from the tow hitch, then there would be an insulation member associated with each of these beams so that the main portion of the chipper 10 is insulated from the tow hitch portion.

The wood chipper or other follow-on apparatus may be constructed with the insert 16 already positioned within the tongue. Also, existing wood chippers may be modified by cutting out a section of the frame and inserting the insert 16. The material of the insert 16 is insulative to electrical signals and thus if there is any energizing via the vehicle 20, this is interrupted so that there is no harmful electrical signals coupled to the main body of the wood chipper. Refer also to the second embodiment of the invention illustrated in FIG. 4 which shows a truck 30 with the typical trailer pintle plate 32 to which the hitch 34 is connected. At least part of the pintle plate 32 is insulated so that no electrical power can be coupled therethrough to the hitch 34.

Thus, in accordance with the present invention there is provided a shock protection apparatus comprising, in combination, a machine being towed 10, a towing vehicle 20 coupled to and for towing the machine being towed, and an electrically insulating insert 16 coupled between the vehicle and machine to prevent the transfer of an electrical shock from the vehicle to the machine. The so-called machine includes a towing tongue 12 and said electrically insulating insert is constructed and arranged in said tongue so as to provide a gap G between separate metal portions 12A and 12B of said tongue 12, such as illustrated in the cross-sectional view of FIG. 3. This gap G is preferably at least three inches so that any electrical impulse cannot bridge the gap between tongue portions 12A and 12B. The electrically insulating insert is constructed of a nonconductive material preferably a hardened fiberglass, and may also be constructed of a hard plastic material such as Kevlar.

Figure 2:
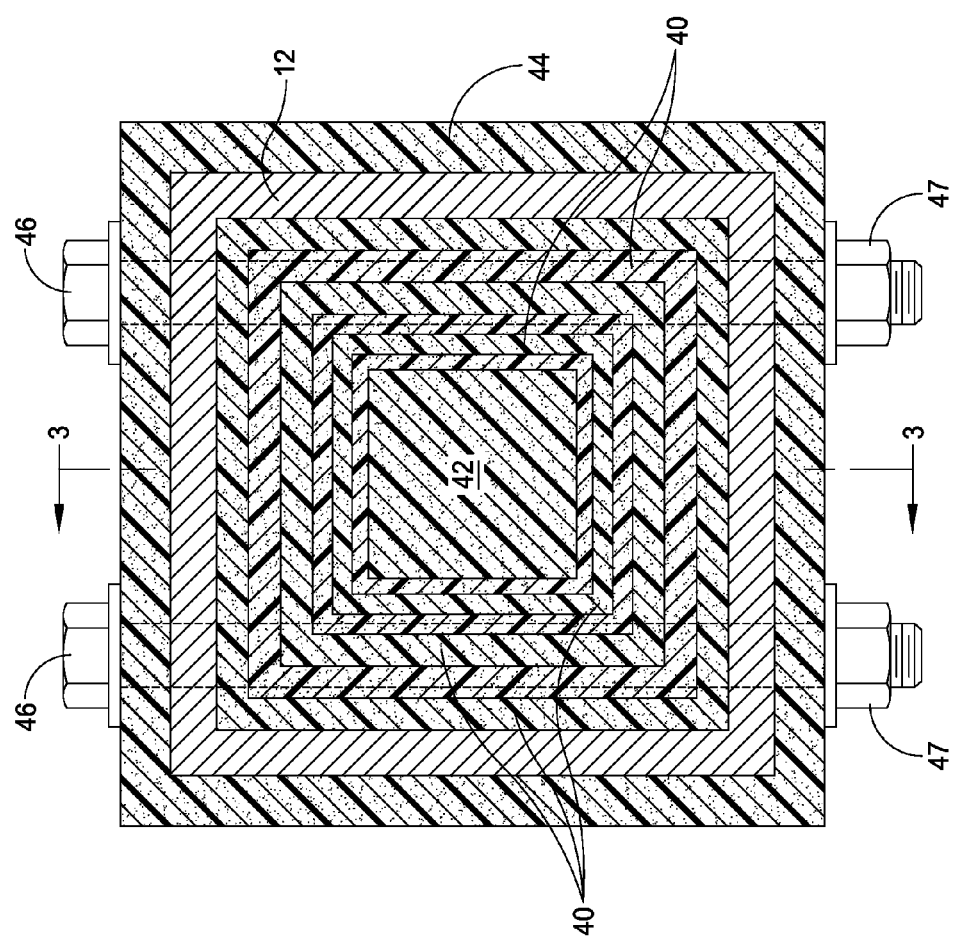
FIG. 2 is a cross-sectional view taken along line 2-2 of FIG. 1.
Figure 2C:
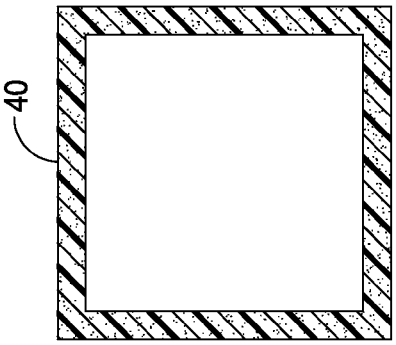
FIGS. 2A-2F are cross-sections of different respective sizes of components comprising the structure.
Figure 2F:
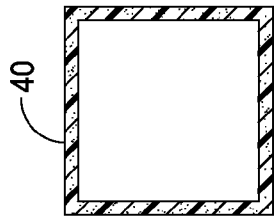
Figure 2B:
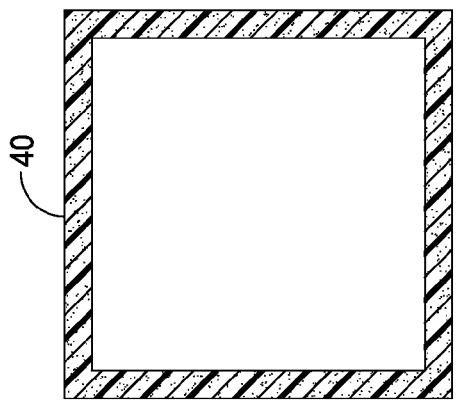
Figure 2E:
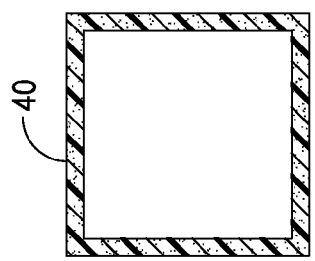
Figure 2A:
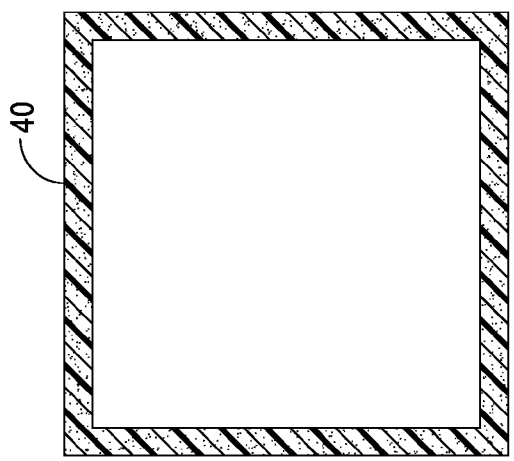
Figure 2D:
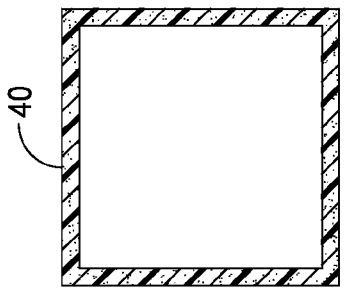
Figure 3:
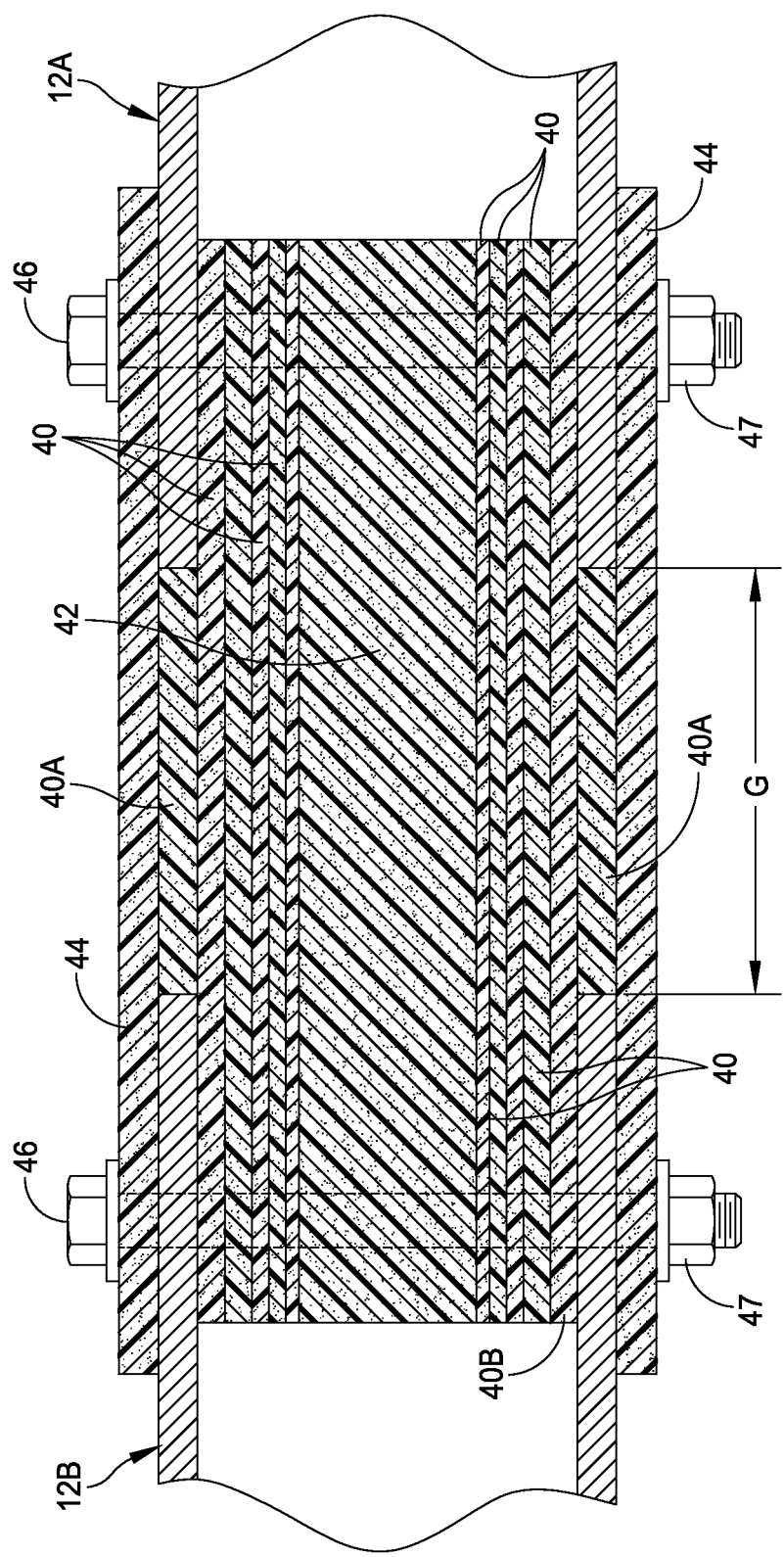
FIG. 3 is a cross-sectional view taken along line 3-3 of FIG. 1.

The electrically insulating insert 16 may be comprised of a series of telescopically arranged tubular pieces such as is illustrated in the cross-sectional views of FIGS. 2 and 3, as well as individually in FIGS. 2A-2F. Each of the different size pieces 40 is formed in a telescopic manner; each inside of a larger piece. Also, each of these pieces have interspersed therebetween an epoxy resin and additional fiberglass matting so as to form a solid and reinforced single integral member. Each of the individual pieces 40 may have a length on the order of 2-3 feet.

This allows at least a one foot length of insertion of the insert into each of the tongue portions 12A, 12B. An outer and next to largest piece 40B has a size so that it fits snuggly into the hollow interior of the tongue portion, as shown in FIG. 3. The largest piece 40 may have an outer diameter of four inches and the smallest piece 40 may have a diameter of 1.5 inches. In one embodiment a total of six pieces 40 are used to fill most of the insert area. The largest piece 40A may be shorter than the other pieces as illustrated in FIG. 3 to make sure it fits in the gap G.

The cross-sectional view of FIG. 2 also shown a center core area 42 which is defined within the inside of the smallest piece 40. This area 42 is preferably filled with a fiberglass matting and an epoxy resin that is hardened to provide a solid and rigid insert member. FIG. 2 also shows the outer collar 44 that bridges across the gap G and extends preferably at least the same distance as the length of the insert itself. The outer collar 44 is also constructed of an insulative material so that no dangerous electrical signals can be coupled through the insert 16.

In the illustrated embodiment the insert has a basically square cross-section. However, in other embodiments of the present invention the cross-section may vary. It may be round or even oval but preferably matches the cross-section of the tongue so that the insert is readily engageable with and preferably within the tongue portions, as illustrated in FIG. 3. Thus, the series of telescopically arranged tubular pieces 40 are constructed and arranged as a single integral member 16 that is formed by including a binder of fiberglass and an epoxy resin including in the center core area 42. As indicated previously, the separate metal tongue portions 12A, 12B are spaced apart (gap G) and the electrically insulating insert has a length greater than the spacing between the separate metal tongue portions so that respective ends of the electrically insulating insert extend into a center hollow section of respective separate metal tongue portions, as illustrated in FIG. 3. Also a collar 44 is disposed over the electrically insulating insert 16 and separate metal tongue portions 12A, 12B. Fasteners are used for securing the collar and electrically insulating insert to the metal tongue portions. In this regard refer to FIG. 3 and the bolts 46 and associated nuts 47. Two bolts may be used adjacent to respective ends of the insert. Each bolt preferably passes through the collar, the tongue portions 12A, 12B and through the insert itself.

Figure 4:
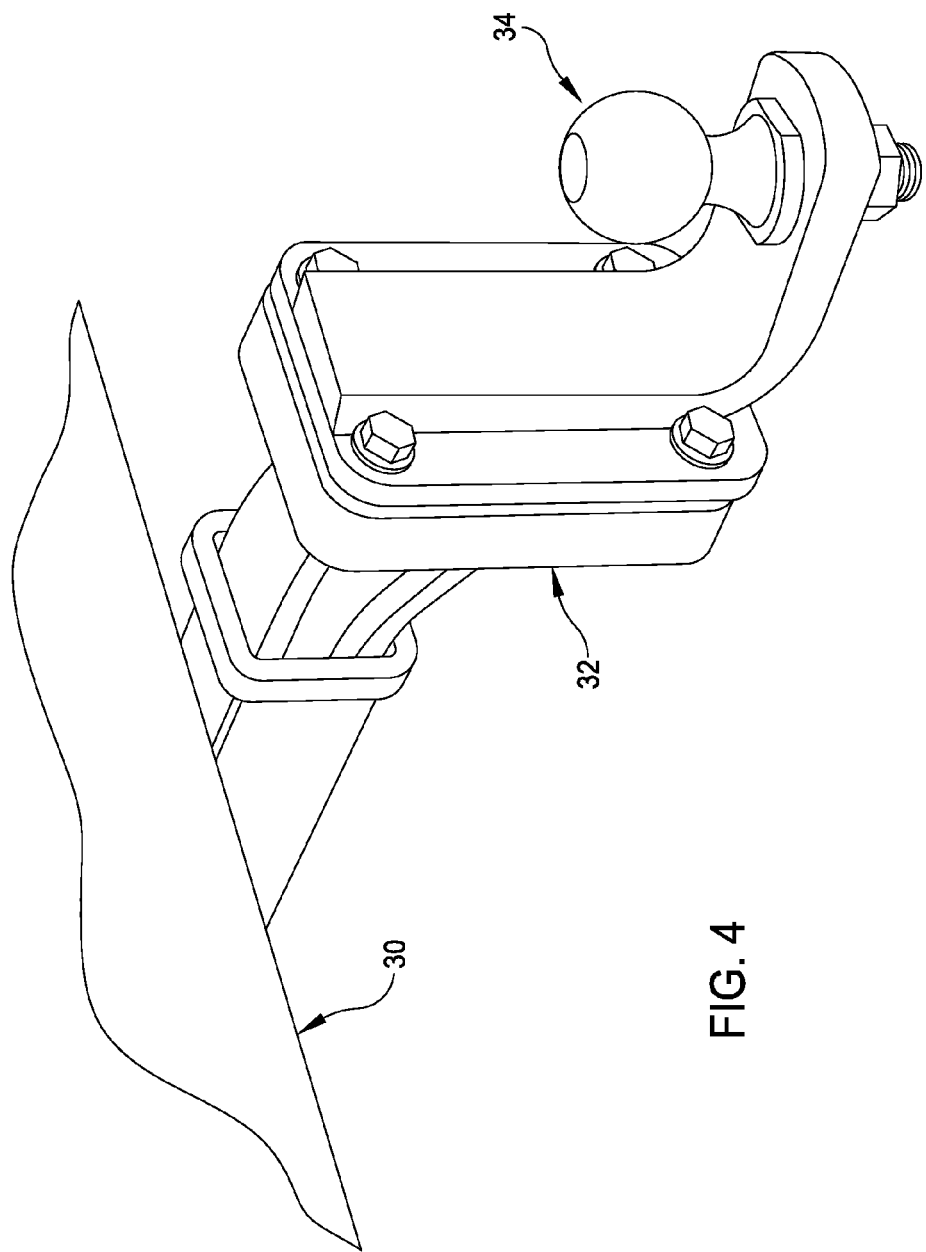
FIG. 4 illustrates the principles of the present invention as applied to the body of the truck.

Thus, although the main description herein provides an insert within the machine or equipment that is being towed, regardless of the type of that machine or equipment, alternatively and with reference to, for example, FIG. 1, the insulative insert can also be provided at the vehicle end of the system such as at vehicle 20 and hitch 22 in FIG. 1. FIG. 4, mentioned previously, also is illustrative of an area where the insulative insert can be provided at the vehicle side. As mentioned previously in connection with FIG. 4, the pintle plate 32 is provided with an insulative layer so that any electrical charge from the vehicle will not be passed to the hitch 34 and thus also not passed to the vehicle or equipment being towed.

Figure 5:
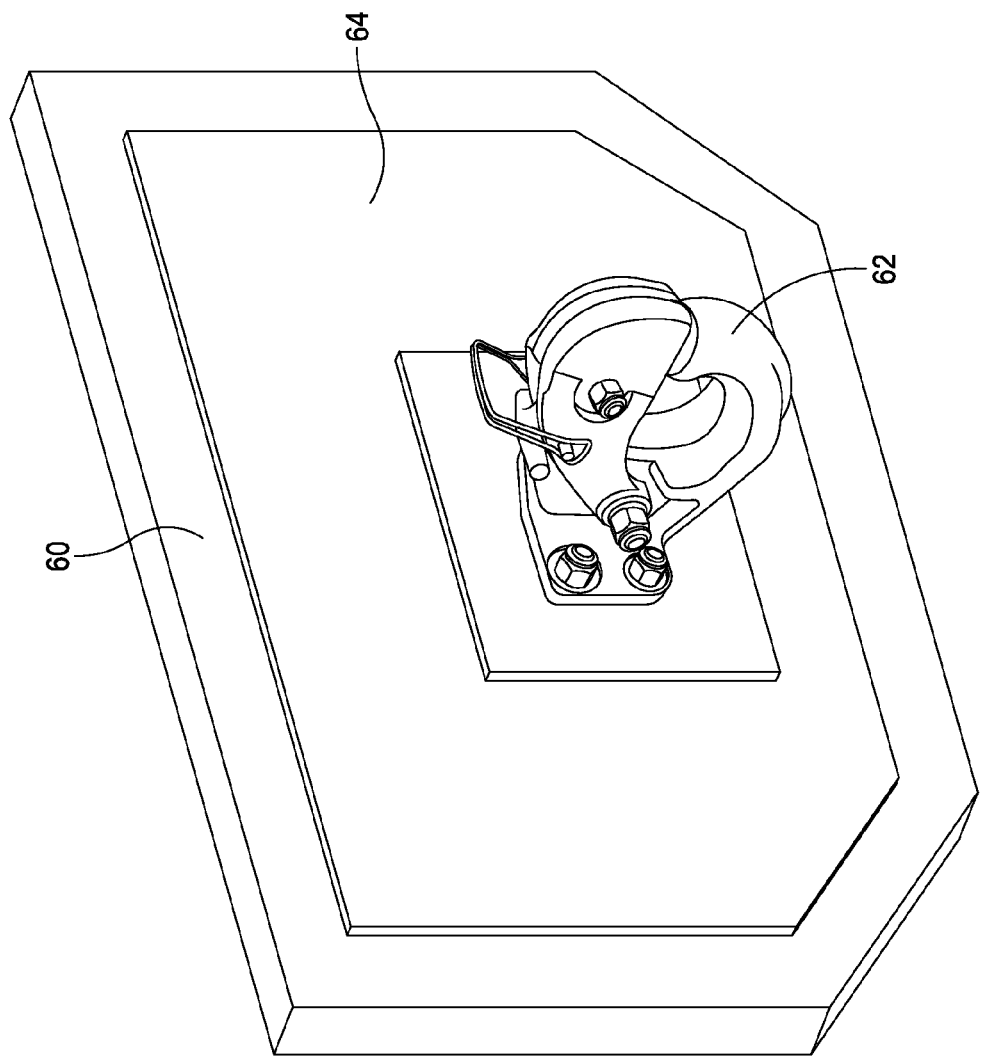
FIG. 5 is a perspective view at the pintle plate frame.

For further details of the vehicle end of the hitch, refer to the pintle plate frame of FIG. 5 which includes a basic steel frame 60. The pintle hitch is shown at 62 and between the frame 60 and the pintle hitch 62 there is provided the insulative insert illustrated at 64. This insulative insert may be constructed primarily of fiberglass that is substantially reinforced so that there is sufficient strength between the steel frame 60 and the hitch 62. The hitch 62 may be constructed in a number of different forms that are presently well known to one skilled in the art.

Having now described a limited number of embodiments of the present invention, it should now be apparent to those skilled in the art that numerous other embodiments and modifications thereof are contemplated as falling within the scope of the present invention, as defined by the appended claims.

What is claimed is:

1. A shock protection apparatus comprising, in combination, a machine being towed, a towing vehicle coupled to and for towing the machine being towed, and an electrically insulating insert coupled between the vehicle and machine to prevent the transfer of an electrical shock from the vehicle to the machine, wherein said machine includes a towing tongue and said electrically insulating insert is constructed and arranged in said tongue so as to provide a gap between separate metal portions of said tongue, and wherein the electrically insulating insert is comprised of a series of telescopically arranged tubular pieces.

2. The combination of claim 1 wherein the machine being towed is a wood chipper machine.

3. The combination of claim 1 wherein the vehicle is a car or truck.

4. The combination of claim 3 wherein the vehicle has a tow hitch including a ball, and said tongue has a tow socket.

5. The combination of claim 1 wherein the electrically insulating insert is constructed of a nonconductive material.

6. The combination of claim 5 wherein the nonconductive material is selected from kevlar or fiberglass.

7. The combination of claim 1 wherein the series of telescopically arranged tubular pieces are constructed and arranged as a single integral member that is formed by including a binder of fiberglass and an epoxy resin.

8. The combination of claim 7 wherein the series of telescopically arranged tubular pieces are one of circular and square leaving a center core area filed with a fiberglass mat and an epoxy resin to form said single integral member.

9. The combination of claim 1 wherein the vehicle has a rear mounted pintle plate formed as the electrically insulating insert.

10. A shock protection apparatus comprising, in combination, a machine being towed, a towing vehicle coupled to and for towing the machine being towed, and an electrically insulating insert coupled between the vehicle and machine to prevent the transfer of an electrical shock from the vehicle to the machine, wherein said machine includes a towing tongue and said electrically insulating insert is constructed and arranged in said tongue so as to provide a gap between separate metal portions of said tongue, and wherein the separate metal tongue portions are spaced apart and the electrically insulating insert has a length greater than the spacing between the separate metal tongue portions so that respective ends of the electrically insulating insert extend into a center hollow section of respective separate metal tongue portions.

11. The combination of claim 10 including a collar disposed over the electrically insulating insert and separate metal tongue portions.

12. The combination of claim 10 including fasteners for securing the collar and electrically insulating insert to the metal tongue portions.

13. For a vehicle that tows a trailing machine or the like, an electrically insulating insert that is disposed between a frame of the vehicle and trailing machine to prevent electrical shock signals from passing from the vehicle to the trailing machine, wherein the trailing machine includes a towing tongue and said electrically insulating insert is constructed and arranged in said tongue so as to provide a gap between separate metal portions of said tongue, and wherein the electrically insulating insert is comprised of a series of telescopically arranged tubular pieces.

14. The insert of claim 13 wherein the series of telescopically arranged tubular pieces are constructed and arranged as a single integral member that is formed by including a binder of fiberglass and an epoxy resin.

15. The insert of claim 14 wherein the series of telescopically arranged tubular pieces are one of circular and square leaving a center core area filed with a fiberglass mat and an epoxy resin to form said single integral member.

16. The insert of claim 15 including a collar disposed over the electrically insulating insert and separate metal tongue portions, and fasteners for securing the collar and electrically insulating insert to the metal tongue portions.

* * * * *